3,027,277
METHOD OF PRODUCING TRANSPARENT ELECTRICALLY CONDUCTIVE COATINGS AND COATED ARTICLE
Petrus Cornelis van der Linden, Eindhoven, Netherlands, assignor, by mesne assignments, to North American Philips Company, Inc., New York, N.Y., a corporation of Delaware
Filed Dec. 7, 1956, Ser. No. 627,053
Claims priority, application Netherlands Dec. 8, 1955
10 Claims. (Cl. 117—211)

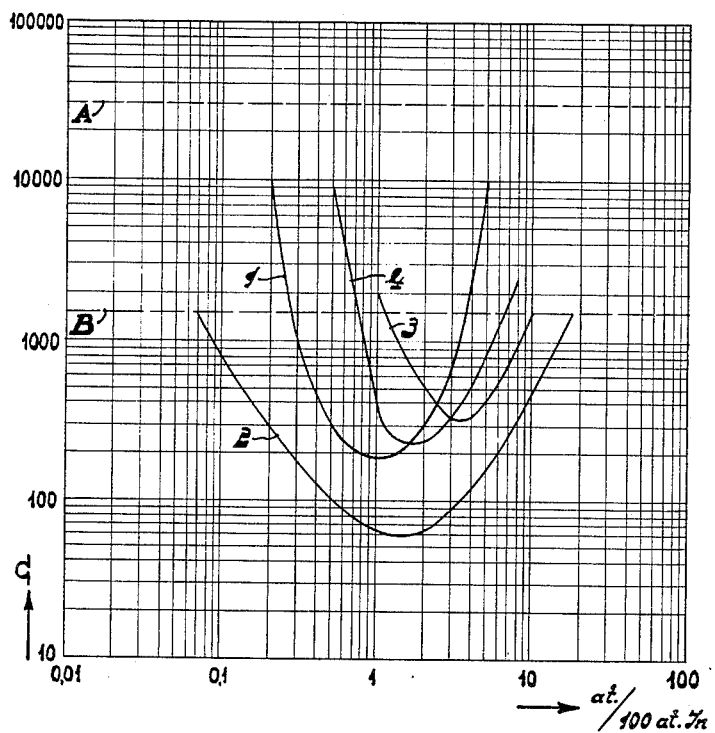

My invention relates to insulating bodies capable of resisting high temperatures, particularly temperatures above 400° C., provided with electrically conductive layers and to a method for preparing such bodies. More particularly my invention relates to insulating bodies which are provided with transparent electrically conductive layers.

The coating of insulating bodies with conductive indium oxide is known in the art. The electrical resistance of these indium oxide layers is however, too high for many purposes.

A principal object therefore of my invention is to provide indium oxide containing coatings of higher electrical conductivity for insulating bodies.

A second principal object of my invention is to provide transparent, highly electrically conductive indium oxide containing coatings for insulating bodies.

These and other objects of my invention will be apparent from the description which follows.

According to my invention I have found that the electrically conductivity of indium oxide containing coatings may be greatly increased and particularly transparent coating of high conductivity may be obtained by including in said coating at least one element selected from the group consisting of phosphorus, germanium, and tellurium. While the incorporation of the elements of this group in any amount will influence the electrical conductivity of indium oxide coatings I have found that better results are obtained if the amounts of these elements are chosen so as to provide from about 0.05 to 20 atoms of at least one of these elements per 100 atoms of indium.

I have further found that optimum increases in the electrical conductivity of the indium oxide layers along with improved ratios of resistance values to transparency are obtained if the amounts of the elements included in the indium oxide were chosen so as to provide from about 0.3 to 4 atoms of phosphorus, about 0.7 to 18 atoms of germanium or about 0.7 to 7 atoms of tellurium per 100 atoms of indium in the coating.

Through the method of my invention it is possible to decrease the resistivity of indium oxide coatings to less than $\frac{1}{20}$ or even $\frac{1}{500}$ of the indium oxide coatings of identical thicknesses but which do not contain the added elements of my invention.

The indium oxide containing coatings of my invention may be used to provide transparent electrically conductive coating on various high temperature resistant insulating bodies, more particularly those insulating bodies that are capable of resisting temperatures of up to at least 400° C. Examples of insulating materials which are particularly suitable to be coated with the coatings of my invention are glass, quartz, ceramic materials, mica and poly-tetrafluorethylene.

The coated insulating bodies of my invention may be used for various purposes, examples of which are resistors, heating devices for laboratory or home use.

The coatings of my invention are particularly adapted to be used in defrosters for window panes in automobiles, aircraft and ships.

The compositions of my invention may be applied to the body to be coated by any suitable means. Thus, the solution of the composition of my invention containing a hydrolyzable indium compound may be sprayed onto a body heated to at least 400° C. or the body heated may be immersed in a solution containing the desired composition. Alternatively the coating may be formed by depositing from a vapor of volatile compounds of indium and the elements to be added on the body to be coated.

As compounds of indium hydrolyzable indium compounds may be used of which the halides, particularly indium chloride, are preferred.

As compounds of the added elements oxides and organic compound such as tricresylphosphate may be used, although the halides and particularly the chlorides are preferred.

When the coatings are manufactured by spraying or immersing, it is possible to use aqueous solutions to which hydrochloric acid may be added in order to prevent premature hydrolysis. However, the use of organic solvents such as ethanol, ethylacetate, butylacetate and carbon tetrachloride is preferred.

My invention will now be more fully explained by reference to the following example, table and drawing, the sole FIGURE in which is a graph showing the relationship between the composition of various coatings of the invention and the resistance of these coatings.

*Example*

A number of glass plates, 2 cms. wide, were throughout their width provided with silver electrical contacts. The distance between these contacts is 6 cms. Five of these plates at a time were then placed in an electric furnace heated to 550° C. These plates were then sprayed with 10 cc. of a solution in ethanol containing 0.5 mol of $InCl_3$ per litre to which, except in one case, various quantities of solutions of 0.05 mol of $PCl_5$, $GeCl_4$ or $TeCl_4$ and mixtures thereof in a mixture of 800 cc. of butyl acetate and 200 cc. of ethanol were added. By adding 1 cc. of one of these solutions to 10 cc. of the $InCl_3$ solutions, solutions containing 1 atom of P, Ge or Te per 100 atoms of In were produced.

The actual spraying was carried out by means of a compressed air spray gun held at a distance of 40 cms. from the plates. During the spraying operation care was taken to prevent the temperature of the plates from dropping more than 50° C.

In the following table is indicated the value of the resistance in ohms per square surface of indium-oxide containing layers obtained by the aforesaid method with $InCl_3$-solutions having a variable content of one or more of the elements P, Ge and Te, indicated in atoms per 100 atoms of In. The resistance indicated is the mean value of measurements carried out on five plates.

The layers thus obtained are transparent and permit more than 75% of the incident light to pass. Only the layers obtained by means of tellurium have a slightly brown colour. The resistance layers according to the invention have a low positive temperature coefficient, especially in the range of low resistivity.

| Added Elements in Atoms Per 100 Atoms In— | Resistance in Ohms per Sq. Surface |
|---|---|
| 0.2 P | 30,000 |
| 0.5 P | 10,000 |
| 1 P | 240 |
| 3 P | 200 |
| 5 P | 600 |
| 0.1 Ge | 10,000 |
| 0.2 Ge | 700 |
| 0.5 Ge | 340 |
| 1 Ge | 140 |
| 3 Ge | 60 |
| 5 Ge | 120 |
| 10 Ge | 150 |
| 0.5 Te | 500 |
| 1 Te | 9,000 |
| 3 Te | 300 |
| 10 Te | 500 |
| 1 Ge + 1 Sb | 2,000 |
| 1 Ge + 1 Te | 400 |
| 1 Sb + 1 Te | 200 |
| 1 P + 1 Sb | 800 |
|  | 600 |

Finally the results obtained are illustrated by the graph in the accompanying drawing. The variation of the resistance is indicated therein logarithmically in ohms per square surface, with varying content of the admixtures in atoms of the added element per 100 atoms of indium. The curves 1, 2, 3 and 4 relate to admixtures of phosphorus, germanium, tellurium and antimony respectively. By way of comparison the line A indicates the value of the resistance obtained by means of indium chloride without the addition, the conditions being otherwise the same and the line B indicates 1/20 part of this value.

While I have described my invention in connection with specific embodiments and applications, other modifications thereof will be readily apparent to those skilled in this art without departing from the spirit and scope of the invention as defined in the appended claims.

What is claimed is:

1. A body formed of an insulating material capable of resisting temperatures of at least 400° C. and coated with an electrically conductive transparent indium oxide layer including an element selected from the group consisting of phosphorus, germanium and tellurium and mixtures of said elements in amounts of from about 0.3 to 4 atoms of phosphorus, from about 0.7 to 18 atoms of germanium and from about 0.7 to 7 atoms of tellurium per 100 atoms of indium.

2. The body of claim 1 in which the coating contains from about 0.7 to 18 atoms of germanium per 100 atoms of indium.

3. The body of claim 1 in which the coating contains from about 0.7 to 7 atoms of tellurium per 100 atoms of indium.

4. The body of claim 1 in which the insulating material is made of glass and the indium oxide layer has a transparency of more than 75%.

5. The article of claim 1 in which the coating contains from about 0.3 to 4 atoms of phosphorus per 100 atoms of indium.

6. In a method of producing transparent electrically conducting films consisting substantially of indium oxide by applying a filming material in fluid form and which comprises an electrically conducting film forming compound of indium to the surface of an insulating body heated to at least 400° C., the step of increasing the electrical conductivity of such films which comprises adding to said filming material, by putting into solution therewith, a compound of an element selected from the group consisting of phosphorus, germanium and tellurium and mixtures thereof in an amount sufficient to provide from about 0.7 to 18 atoms of germanium, from about 0.3 to 4 atoms of phosphorus and from about 0.7 to 7 atoms of tellurium per 100 atoms of indium.

7. The method of claim 6 in which the compounds used are all halides.

8. The method of claim 6 in which the compounds used are all chlorides.

9. The method of claim 6 in which the solution is applied by spraying.

10. The method of claim 6 in which organic solvents are used.

References Cited in the file of this patent

UNITED STATES PATENTS

| 2,118,795 | Littleton | May 24, 1938 |
| 2,564,677 | Davis | Aug. 21, 1951 |
| 2,564,706 | Mochel | Aug. 21, 1951 |
| 2,564,987 | Mochel | Aug. 21, 1951 |
| 2,692,836 | McAuley | Oct. 26, 1954 |
| 2,694,649 | Tarnopol | Nov. 16, 1954 |
| 2,772,190 | Haayman et al. | Nov. 27, 1956 |

FOREIGN PATENTS

| 157,608 | Australia | July 13, 1954 |
| 732,566 | Great Britain | June 29, 1955 |

OTHER REFERENCES

Holland: "Vacuum Deposition of Thin Films, John Wiley & Sons, Inc., New York, N.Y., pages 493–496.

Aitchison: "Australian Journal of Applied Science," vol. 5, page 10 et seq. September 1954.